Dec. 10, 1963  D. J. BURKE  3,113,359
MOLDS FOR COMPOSITE CASTING
Filed Jan. 9, 1961  3 Sheets-Sheet 2

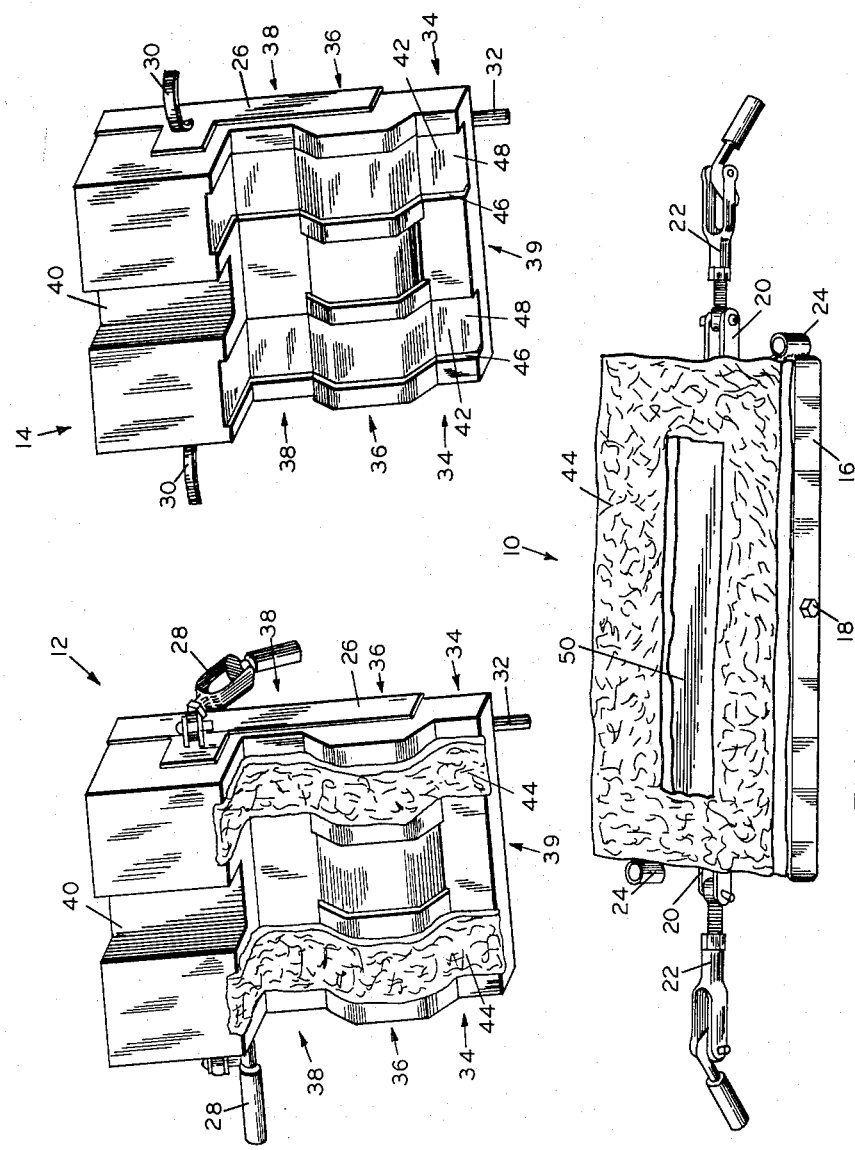

INVENTOR.
DONALD J. BURKE
BY
Head & Johnson
ATTORNEYS

Dec. 10, 1963   D. J. BURKE   3,113,359
MOLDS FOR COMPOSITE CASTING
Filed Jan. 9, 1961   3 Sheets-Sheet 3

INVENTOR.
DONALD J. BURKE
BY
Head & Johnson
ATTORNEYS

United States Patent Office 3,113,359
Patented Dec. 10, 1963

3,113,359
MOLDS FOR COMPOSITE CASTING
Donald J. Burke, Tulsa, Okla., assignor to Continental Industries, Inc., a corporation of Oklahoma
Filed Jan. 9, 1961, Ser. No. 81,402
4 Claims. (Cl. 22—116)

This invention relates to exothermic welding molds. More particularly, the invention relates to improvements in exothermic molds including means whereby metallic components of irregular configuration may be successfully welded together utilizing the exothermic welding process.

The exothermic welding process is a well known and highly useful means of welding together metallic components. According to this process a molten weld metal of high heat intensity is generated by exothermic reaction which is induced to flow into contact with the metallic surfaces to be joined. Due to the extremely high temperatures created in the exothermic reaction, the molten weld metal has a high degree of liquidity. When the process is utilized to weld materials such as bars, rods, pipes and so forth, which have a relatively regular and consistant configuration, molds can be manufactured which closely fit the external surfaces of the materials to be welded so that the exothermically produced molten metal is easily retained within the weld cavity. When the exothermic process is utilized to weld together metallic components having irregular surfaces, such as reinforcing rods or rails for railroad systems as utilized in mines, a difficult problem of providing means for containing the molten weld metal within the weld cavity is encountered.

Broadly stated, and not by way of limitation, this invention may be described as an exothermic mold adaptable for welding together metallic components, said mold comprising a sectionalized body of refractory material, having when assembled, a weld cavity therein adaptable for receiving exothermically created molten weld metal, and at least two components cavities therein intersecting said weld cavity, each of said component cavities having a cross-sectional configuration substantially equal to the cross-sectionl configuration of said metallic components whereby said metallic components are supported to extend into said weld cavity in ultimately desired juxtaposed relationship, each of said component cavities having a packing groove formed thereabout, said packing grooves adaptable to receive packing material whereby said packing material engages said metallic elements and is compressed thereby to sufficient density to impede the flow of molten weld metal from the weld cavity through said compartment cavities and prevent escape thereof from the mold so that the molten metal will contact the metallic components and solidify in welded engagement with the two metallic members.

It is therefore an object of this invention to provide a mold for utilizing the exothermic welding process including means for restraining the molten weld metal within the welding cavity of the mold.

Another object of this invention is to provide a mold having a weld cavity, including means for supporting packing material, whereby the packing material is positioned around the objects to be welded to prevent the escape of molten weld metal from the weld cavity.

Another object of this invention is to provide a mold having a weld cavity adaptable for receiving molten weld metal and, having component cavities intersecting the weld cavity adaptable to support metallic components in position for welding, including packing grooves surrounding the metallic components accessible from the exterior of the mold whereby packing may be inserted into the packing grooves to prevent the escape of molten weld metal from the weld cavity.

These and other objects and a better understanding of the invention may be had by referring to the following description and claims taken in conjunction with the attached drawings, in which:

FIGURE 1 is an isometric view of the three principal components of a mold utilizing the principles of this invention adaptable for welding rails together.

Figure 3:
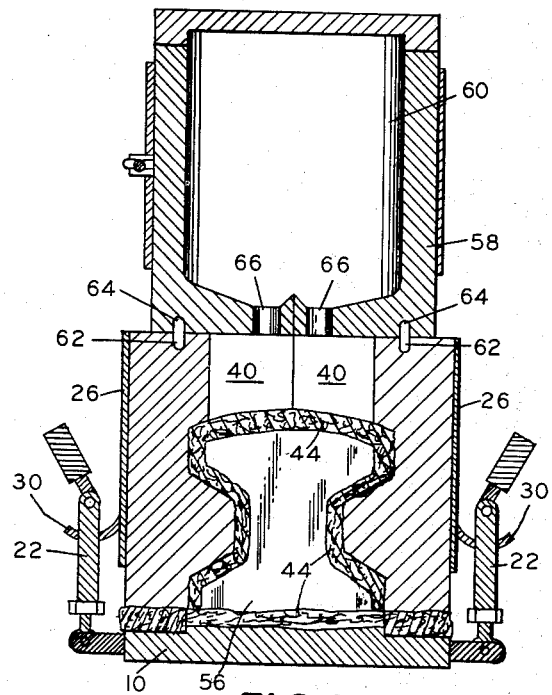

FIGURE 3 is a cross-section of the completely assembled mold as positioned around abutting rails. A crucible cavity portion is affixed to the top of the mold. The mold is ready to receive an exothermic charge preparatory to the thermic reaction which will weld the rails together.

Figure 4:
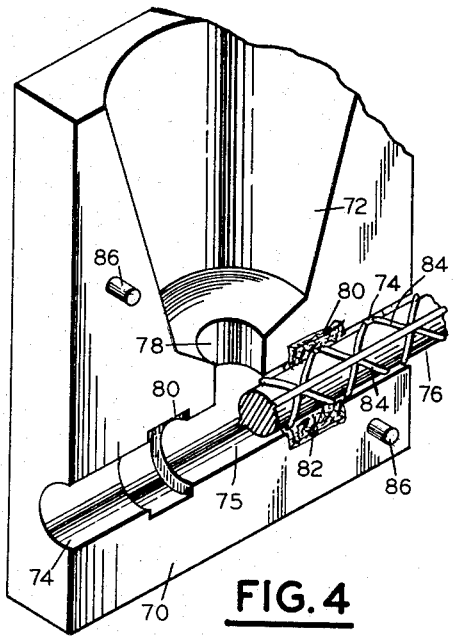

FIGURE 4 is a partial isometric view of one-half of a bifurrcated mold showing the application of the principles of this invention to a mold adaptable for welding together abutting reinforcing rods.

Figure 5:
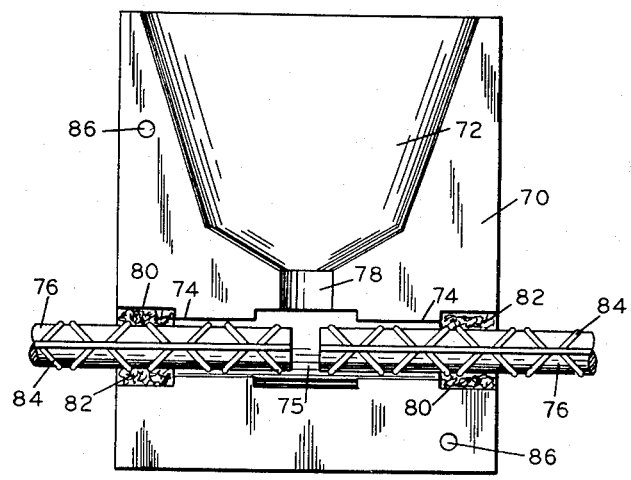

FIGURE 5 is a plan view of one-half of a bifurcated mold adapted to weld in abutting alignment two lengths of reinforcing rods utilizing an alternate embodiment of this invention wherein packing is placed around the reinforcing rods externally of the mold.

Figure 6:
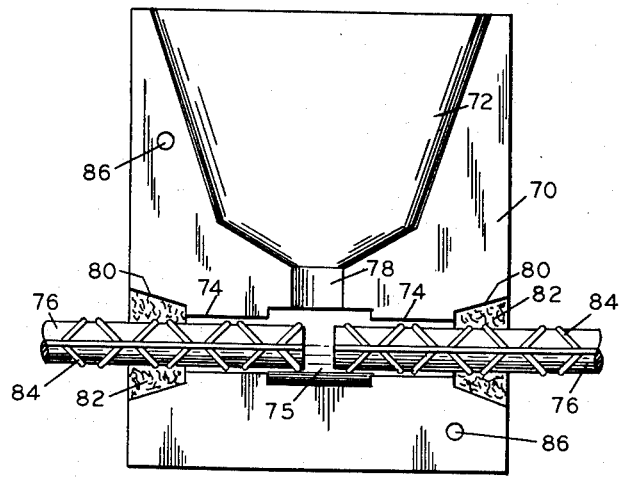

FIGURE 6 is an alternate arrangement of the embodiment of FIGURE 5 wherein the packing grooves are tapered to facilitate positioning packing around the reinforcing rods.

Referring first to FIGURE 1, a mold utilizing the principles of this invention is shown. For purposes of demonstrating the application of the principles of this invention to a specific problem of providing means of welding together metallic components having irregular external configurations, a mold is shown particularly adaptable for welding in abutting alignment to rails. The mold is sectionalized and consists of three portions, a base portion, indicated generally by the numeral 10, a first half body portion, indicated generally by the numeral 12, and a second half body portion indicated generally by the numeral 14. The base portion 10 is a relatively flat rectangular shaped element composed of a refractory material, such as graphite. Surrounding the graphite material is a metal band 16 which is supported by screws 18. The metal band 16 provides means whereby clamp hinges 20 are secured to the base portion 10. Post receptacles 24 are also affixed to metal band 16.

First half body portion 12 and second half body portion 14 are formed substantially identically to each other, of a refractory material such as graphite. A metal reinforcing plate 26 is placed across the back of each of the body portions 12 and 14 as means of reinforcing the body portions and as a means of supporting clamps 28 and clamp catchers 30. Posts 32 are positioned in body portions 12 and 14 adaptable, when body portions 12 and 14 are fastened together, to engage post receptacles 24.

Body portions 12 and 14 are formed so that when joined together they provide a cavity therebetween having a configuration substantially equal to the external configuration of the metallic components which are to be welded. In this instance, the configuration of body portions 12 and 14 is that which is necessary to weld together rails. Thus, a cavity area indicated by the numeral 34 is provided for the rail base, a cavity area indicated by the numeral 36 is provided for the rail web and a cavity area indicated generally by the numeral 38 is provided for the rail upper portion. When the body portions 10, 12 and 14 are assembled to form a complete mold the cavity areas 34, 36 and 38 form component cavities.

In the center of the mold an area is provided, indicated generally by the numeral 39, as a weld cavity. The welding of the metallic components takes place in the weld cavity 39. Formed in the body portions 12 and 14 are flow or sprue cavities 40 whereby molten metal is charged into the weld cavity 39.

The most difficult problem of exothermically welding rails together, and any other metallic components having irregular surfaces, is that of providing a mold which will conform so closely to the external configuration of the rails so as to prevent the leakage of the molten weld metal. According to the principles of this invention this difficulty has been overcome in a unique and highly successful manner by the provision of packing grooves 42 (shown best in mold half 14), which substantially surround the metallic elements to be welded. Packing grooves 48 are positioned to substantially surround the component cavities formed in the assembled mold. These packing grooves 48 are adaptable to receive packing material 44 as shown in proper position on mold half 12.

Grooves 42 may be from approximately one-half (½) to two (2) inches wide according to the over-all size of the metallic components being welded. It has been found that a serviceable depth of grooves 42 is approximately one-eighth (⅛) inch although small depths or grooves having considerably greater depths will also be applicable.

The depth of grooves 42 will depend to a great extent upon how close the mold can be manufactured so that the component cavities are approximately the external configuration of the metallic components to be welded. If the mold can be made to fairly accurately approximate the external configuration of the metallic components to be welded the depth of grooves 42 may be relatively shallow whereas if the molds do not fit the components as well, requiring greater compressibility of the packing material 44 to absorb physical irregularities, grooves 42 having greater depths will be preferred.

It has been determined that the preferred configuration of grooves 42 is that of a rectangular nature, that is, wherein the sides 46 intersect the bottoms 48 of the grooves substantially at a right angle. This rectangular groove configuration has advantage in that the packing material 44 is much more easily retained within the grooves 48 preparatory to assembling the molds around the components to be welded. Grooves having other configurations, however, will also work satisfactorily.

To prevent leakage of molten weld metal between body portions 12 and 14 and base portion 10 a blanket of packing material 44 is placed on the base portion 10. An opening 50 is provided in the blanket of packing material 44 at the area where the rails will be welded to insure welding of the rails around their complete external circumference.

Figure 2:
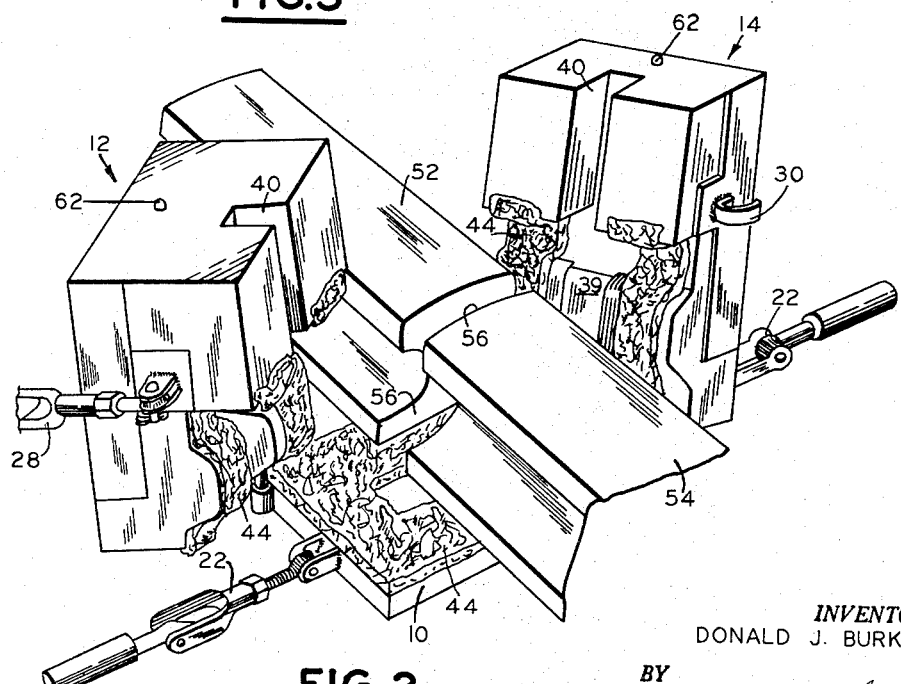
FIGURE 2 is an isometric view showing the principal components of the mold of FIGURE 1 in positions to fit around two abutting rails preparatory to welding the rails together.

The assembly of the mold portions 10, 12 and 14, in preparation for welding together two lengths of rails is shown in FIGURE 2. The rails 52 and 54 are positioned end to end with a small separation between the rail ends 55 and 56 to provide an area to receive molten weld metal. Rails 52 and 54 are positioned on base portion 10 and the body portions 12 and 14 are placed on base portion 10 and around rails 52 and 54 and clamped into position. The packing material 44, supported in grooves 42, completely surrounds the area of the rails 52 and 54 to be welded and thereby the escape of liquid molten weld metal away from the weld cavity 39 is prevented.

The cross-sectional view of FIGURE 3 shows the mold of this invention completely assembled and ready to receive the exothermic mixture. Positioned on top of the assembled mold portions 12 and 14 is a crucible 58 having a crucible cavity 60 formed therein in which is deposited a thermit mixture. The thermit is reacted to produce molten weld metal. Crucible 58 is aligned in position atop body portions 12 and 14 by the provision of pins 62 formed in the body portions 12 and 14 which protrude into holes 64 in the crucible 58.

In the bottom of crucible 58 are sprue passages 66 whereby the molten weld metal flows from the crucible cavity 60 into sprue cavity 40 of body portions 12 and 14 to enter the welding cavity 39. In this disclosure the crucible 58 is shown as a separate portion of the total mold, in many instances the crucible portion 58 will be integrally formed with the other portions of the sectionalized mold.

Clamp catchers 68 are affixed to metal plates 26 to receive clamps 22 affixed to base 10 whereby the body portions 12 and 14 are securely supported to the base 10.

Upon the reaction of a thermit charge in crucible cavity 60 extremely hot and highly liquid molten metal enters weld cavity 39. Packing material 44, supported in packing grooves 42, compresses against all sides of rails 52 and 54 to sufficient density to impede the flow of molten metal from the weld cavity 39, permitting the molten metal to solidify and weld together rails 52 and 54.

FIGURE 4 demonstrates the application of the principles of this invention to a problem of welding together other metallic components of irregular configuration, in this instance, reinforcing rods. Whereas the welding of symmetrical rods has been an accomplishment of exothermic welding for some time, the welding of reinforcing rods has heretofore presented an insurmountable problem in that reinforcing rods are purposely manufactured to have irregular exterior surfaces. Utilizing the principles of this invention reinforcing rods can be readily welded together. One-half of a bifurcated mold 70 is shown in isometric view. A crucible cavity 72 is integrally formed in mold half 70. Component cavities 74 are formed in mold 70, intersecting a weld cavity 75 adaptable to receive and support in ultimately desired juxtaposed position two abutting reinforcing rods 76 (only one of which is shown in FIGURE 4). Connecting to crucible cavity 72 is a sprue cavity 78 communicating to the weld cavity 75. In practice rods 76 will not extend to actually touch but to leave a small gap therebetween to receive the molten weld metal.

According to the principles of this invention grooves 80 are formed around component cavities 74 adjacent weld cavity 75. Prior to assembly of the mold 70 to perform the welding process, packing 82 is positioned in packing grooves 80. The protrusions 84 which are integrally formed on reinforcing rods 76 have heretofore prevented the successful commercial application of the exothermic process to the welding of this type of rods. The provision of a mold 70 having component cavities 74 to fit rods 76 sufficiently close to prevent the escape of the molten weld metal are not economically and practically feasible to produce. By providing grooves 80 adaptable to receive and hold in position packing 82, the irregularities of the external configuration of reinforcing rods 76 are sealed against. The packing retains the molten weld metal around the abutting ends of the reinforcing rods to be welded so that the molten weld metal does not escape but is retained in position until solidification, securely welding the rods together. Pins 86 are affixed to protrude from the surface of mold half 70 to engage holes in the companion mold half (not shown). Mold half 70 has pins 86 and the companion mold half not shown has holes to receive pins 86, the mold halves are otherwise substantially identical. When placed together with packing in grooves 80 around abutting reinforcing rod 76 the mold halves are supported together, ready for receiving the exothermic mixture in crucible cavity 72. The thermic mixture is ignited producing an exothermic reaction causing molten weld metal to flow through sprue cavity 78 into the rod cavity 74 where it is retained in position by packing 82 until solidification occurs, securely welding rods 72 together.

FIGURE 4 discloses an arrangement wherein the grooves 80 surrounding component cavities 74 and adaptable to receive packing 82 are positioned adjacent the weld cavity 75. In this embodiment packing 82 is positioned in packing grooves 80 before the mold halves 70 are positioned around abutting reinforcing rods 76. An alternate embodiment of the invention is shown in FIGURES 5 and 6.

FIGURES 5 and 6 each show a plan view of one half of a bifurcated mold similar to the mold described with reference to FIGURE 4. The only difference in the mold of FIGURE 5 and that of FIGURE 4 is that in FIGURE 5 the packing groove 80 is positioned to communicate with the exterior of the mold 70. Packing 82 positioned in packing grooves 80 serves the same functions to conform to and seal the irregularities of reinforcing rods 76, or any other metallic components positioned in component cavities 74, preventing the escape of molten weld metal from weld cavity 75 as described with reference to FIGURE 4. The only difference between the mold of FIGURE 5 compared to that of FIGURE 4 is that in utilizing the mold of FIGURE 4 packing 82 must be positioned in packing grooves 80 before the mold halves 70 are assembled around reinforcing rods 76, wherein in the embodiment of FIGURE 5 packing 82 may be placed in grooves 80 either before or after the mold halves 70 (only one of which is shown) are placed around reinforcing rods 76. In this manner, the mold 70 may be first assembled around reinforcing rods 76 and then packing 82 can be inserted into grooves 80 from the exterior of the assembled mold 70 to seal around reinforcing rods 76. A thermit charge may then be placed in crucible cavity 72 for reaction to discharge molten weld metal through sprue cavity 78 into weld cavity 75 to weld together juxtaposed reinforcing rods 76.

An alternate arrangement of FIGURE 5 is shown in FIGURE 6. In this embodiment packing grooves 80 surrounding component cavities 74 (adaptable to receive reinforcing rods 76) and communicating with the exterior of mold 70 are of a tapered configuration whereby the cross-sectional area of the tapered packing grooves 80 increases towards the exterior of the mold 70 to facilitate positioning and compressing packing 82 into the packing grooves 80.

It can be seen that packing grooves 80 surrounding component cavities 74 may be placed in any position from immediately adjacent to weld cavity 75, as shown in FIGURE 4, to a position to communicate with the exterior of the mold, as shown in FIGURE 5.

Packing 80 may be selected from any compressible material having properties to withstand the intense heat of the exothermically produced molten weld metal. Some melting or decomposition of the packing 80 is not fatal to the performance of a weld as long as sufficient packing remains to prevent the escape of molten weld metal for the few seconds required for solidification.

It has been determined that ceramic wool or felt is an excellent packing material for the purposes of this invention. Such material is commercially available from The Carborundum Company, Niagara Falls, New York, under the designation of Fiberfrax Ceramic Fiber XV–Felt.

Other types of packing material which perform satisfactorily as applied according to the principles of this invention are carbon felt and graphite felt. These materials are commercially available from the National Carbon Company, New York City, New York. It is not to be construed that this invention is limited to the packing materials mentioned herein, as these are only suggested packing materials which have proved satisfactory in practicing the invention.

This invention makes possible the welding together of metallic components having irregular configurations, rails and reinforcing rods being examples, utilizing the speed, convenience and economy of the exothermic welding process.

Although this invention has been described with a certain degree of particularity, it is manifest that many changes may be made in the details of construction and arrangement of components without departing from the spirit and scope of this disclosure.

I claim:

1. An exothermic mold adaptable for welding together metallic components, said mold comprising a sectionalized body of refractory material, having when assembled, a weld cavity therein adaptable for receiving exothermically created molten weld metal, and at least two component cavities therein intersecting said weld cavity, each of said component cavities having a cross-sectional configuration substantially equal to the cross-sectional configuration of said metallic components whereby said metallic components are supported to extend into said weld cavity in ultimately desired juxtaposed relationship, each of said component cavities having a packing groove formed thereabout, each of said packing grooves being of a width less than the length of said component cavities as said width and length are measured parallel to the longitudinal axis of said metallic components as said components are supported in said mold, and compressible refractory packing material positioned in said packing grooves to compressibly and sealably engage said metallic elements.

2. An exothermic mold adaptable for welding together metallic components, said mold comprising a sectionalized body of refractory material, having when assembled, a weld cavity therein, a crucible cavity therein above said weld cavity adaptable to receive an exothermic welding mix whereby when said exothermic welding mix is ignited a quantity of molten weld metal is produced in said crucible cavity, a sprue cavity connecting said crucible cavity with said weld cavity whereby exothermically created molten weld metal is charged into said weld cavity, at least two component cavities therein intersecting said weld cavity, each of said component cavities having a cross-sectional configuration substantially equal to the cross-sectional configuration of said metallic components whereby said metallic components are supported to extend into said weld cavity in ultimately desired juxtaposed relationship, each of said component cavities having a packing groove formed thereabout, each of said packing grooves being of a width less than the length of said component cavities as said width and length are measured parallel to the longitudinal axis of said metallic components as said components are supported in said mold, and compressible refractory packing material positioned in said packing grooves to compressibly and sealably engage said metallic elements.

3. A mold according to claim 2 wherein each of said packing grooves surrounding said component cavities communicates with the exterior of said mold whereby said sectionalized mold may be assembled having said metallic components supported in said component cavities and extending into said weld cavity in ultimately desired juxtaposed relationship and wherein said packing material is compressibly and sealably positioned into said packing grooves.

4. A mold according to claim 3 wherein each of said packing grooves surrounding said component cavities and communicating with the exterior of said mold are of a tapered configuration whereby the cross-sectional area of said tapered grooves increases toward the exterior of said mold to facilitate positioning and compressing of said packing into said grooves.

References Cited in the file of this patent

UNITED STATES PATENTS

| | | |
|---|---|---|
| 1,168,061 | Deppeler | Jan. 11, 1916 |
| 1,168,062 | Deppeler | Jan. 11, 1916 |
| 2,887,743 | Burke | May 26, 1959 |
| 2,957,214 | Kuharski | Oct. 25, 1960 |
| 3,004,310 | Burke | Oct. 17, 1961 |